United States Patent
Okamoto et al.

(10) Patent No.: US 9,593,202 B2
(45) Date of Patent: Mar. 14, 2017

(54) POLYCARBONATE RESIN COMPOSITION PELLETS AND PROCESS FOR MANUFACTURING SAME

(71) Applicant: IDEMITSU KOSAN CO., LTD., Tokyo (JP)

(72) Inventors: Yoshio Okamoto, Chiba (JP); Takayoshi Tanaka, Chiba (JP); Masami Takimoto, Chiba (JP); Yasunobu Yamazaki, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 9 days.

(21) Appl. No.: 14/369,487

(22) PCT Filed: Dec. 27, 2012

(86) PCT No.: PCT/JP2012/083966
§ 371 (c)(1),
(2) Date: Jun. 27, 2014

(87) PCT Pub. No.: WO2013/100090
PCT Pub. Date: Jul. 4, 2013

(65) Prior Publication Data
US 2014/0364546 A1    Dec. 11, 2014

(30) Foreign Application Priority Data

Dec. 28, 2011 (JP) .................. 2011-290051

(51) Int. Cl.
| | |
|---|---|
| C08L 69/00 | (2006.01) |
| C08K 5/103 | (2006.01) |
| C08G 64/06 | (2006.01) |
| B29B 9/12 | (2006.01) |
| B29C 47/00 | (2006.01) |
| G02B 1/04 | (2006.01) |
| C08K 5/527 | (2006.01) |

(52) U.S. Cl.
CPC .............. C08G 64/06 (2013.01); B29B 9/12 (2013.01); B29C 47/0011 (2013.01); C08L 69/00 (2013.01); G02B 1/045 (2013.01); C08K 5/103 (2013.01); C08K 5/527 (2013.01); C08L 2205/025 (2013.01); C08L 2205/03 (2013.01); C08L 2205/035 (2013.01)

(58) Field of Classification Search
CPC ....................................... C08L 69/00
See application file for complete search history.

(56) References Cited

U.S. PATENT DOCUMENTS

| | | | | |
|---|---|---|---|---|
| 4,013,745 A | * | 3/1977 | Brinkmann | ......... B29B 17/0005 264/146 |
| 5,073,313 A | | 12/1991 | Umemura et al. | |
| 5,180,786 A | * | 1/1993 | Era | ........ C08F 279/02 525/204 |
| 2002/0060378 A1 | | 5/2002 | Miyamoto et al. | |
| 2003/0173546 A1 | | 9/2003 | Hiroshi et al. | |
| 2005/0049368 A1 | | 3/2005 | Maruyama et al. | |
| 2007/0037906 A1 | | 2/2007 | Kawato et al. | |
| 2008/0287610 A1 | | 11/2008 | Ishikawa et al. | |
| 2009/0162628 A1 | | 6/2009 | Kurokawa et al. | |
| 2009/0185363 A1 | | 7/2009 | Ishikawa | |
| 2010/0149644 A1 | * | 6/2010 | Kogure | ................ G02B 5/0278 359/599 |
| 2010/0244303 A1 | * | 9/2010 | Uchimura | ................. B29B 9/06 264/148 |
| 2012/0190778 A1 | * | 7/2012 | Wehrmann | ................ C08K 5/49 524/91 |
| 2012/0309874 A1 | | 12/2012 | Takimoto et al. | |
| 2014/0042646 A1 | | 2/2014 | Kurokawa et al. | |
| 2015/0018511 A1 | * | 1/2015 | Tanaka | ....................... B29B 9/06 528/219 |

FOREIGN PATENT DOCUMENTS

| | | |
|---|---|---|
| CN | 1449429 A | 10/2003 |
| CN | 101213256 A | 7/2008 |
| JP | 2 180954 | 7/1990 |
| JP | 11 158364 | 6/1999 |
| JP | 2002 60609 | 2/2002 |
| JP | 2005 96421 | 4/2005 |
| JP | 2005-112963 A | 4/2005 |
| JP | 2005-247947 A | 9/2005 |
| JP | 2007-131679 A | 5/2007 |
| JP | 2007-204737 A | 8/2007 |
| JP | 2007-302794 A | 11/2007 |

(Continued)

OTHER PUBLICATIONS

Chanes (Chapter 24: The Role of Rheology in Extrusion. Engineerying and Food for the 21st Century. CRC Press, 2002. 23 pages).*
Office Action issued Aug. 18, 2015 in Japanese Patent Application No. 2011-290051.
International Search Report Issued Feb. 19, 2013 in PCT/JP12/083966 Filed Dec. 27, 2012.
Combined Chinese Office Action and Search Report issued Oct. 26, 2015 in Patent Application No. 201280065278.6 (with English translation of categories of cited documents).

(Continued)

*Primary Examiner* — Brieann R Fink

(74) *Attorney, Agent, or Firm* — Oblon, McClelland, Maier & Neustadt, L.L.P.

(57) ABSTRACT

Provided is a polycarbonate resin composition pellet, which has a light transmittance at a wavelength of 380 nm of 97.0% or more when the light transmittance is measured by using a methylene chloride solution having a concentration of 12 g/dL, the solution being charged into a quartz glass cell having an optical path length of 5 cm, and which has a viscosity-average molecular weight (Mv) of from 11,000 to 22,000.

11 Claims, No Drawings

(56) References Cited

FOREIGN PATENT DOCUMENTS

| JP | 2009-298994 A | 12/2009 |
|---|---|---|
| JP | 2010-275484 A | 12/2010 |
| JP | 2011 214015 | 10/2011 |
| WO | 2011 007427 | 1/2011 |
| WO | WO 2011/083635 A1 | 7/2011 |

OTHER PUBLICATIONS

Office Action issued Nov. 15, 2016 in Chinese Patent Application No. 201280065278.6.
Takasuki Kazuhiro; "Blending and dispensing technology of polymer, detailed failure factor and solution thereof"; Technical Information Institute; Dec. 25, 2003 pp. 14-21 and 190-197.

\* cited by examiner

POLYCARBONATE RESIN COMPOSITION PELLETS AND PROCESS FOR MANUFACTURING SAME

CROSS REFERENCE TO RELATED APPLICATIONS

The present application is a 35 U.S.C. §371 national stage patent application of International patent application PCT/JP2012/083966, filed on Dec. 27, 2012, published as WO/2013/100090 on Jul. 4, 2013, the text of which is incorporated by reference, and claims the benefit of the filing date of Japanese application no. 2011-290051, filed on Dec. 28, 2011, the text of which is also incorporated by reference.

TECHNICAL FIELD

The present invention relates to a polycarbonate resin composition pellet and a method of producing the pellet, and more specifically, to a polycarbonate resin composition pellet to be used as a raw material for an optical member such as a light-guiding plate of a liquid crystal backlight unit and a method of producing the pellet.

BACKGROUND ART

A polycarbonate resin or resin composition (hereinafter sometimes abbreviated as "PC") has been used as the light-guiding member of a small liquid crystal display from the viewpoints of its heat resistance and mechanical strength (see, for example, Patent Document 1). In general, the PC is granulated into a pellet at 240 to 270° C. by extrusion granulation, and the pellet is subjected to injection molding or extrusion molding to be molded into various members.

By the way, in the anti-light incidence portion of a light-guiding member using the PC, light is liable to yellow and hence the color tone uniformity of a screen is hardly obtained. The tendency is becoming more remarkable in today's circumstances where an increase in size of a display is significant.

Various attempts have been made to improve the light transmittance of the PC in a short wavelength region. However, the attempts are still insufficient and cannot be said to be at sufficient levels in practical use.

CITATION LIST

Patent Documents

[Patent Document 1] JP 11-158364 A

SUMMARY OF INVENTION

Technical Problem

The problem to be solved by the present invention is to provide a polycarbonate resin composition pellet that has a high light transmittance in a short wavelength region and is excellent in color tone uniformity when molded into a light-guiding member.

Solution to Problem

As a result of their extensive studies, the inventors of the present invention have found that the light transmittance of a polycarbonate resin composition in a short wavelength region is largely influenced by thermal hysteresis at the time of the kneading of the polycarbonate resin composition and at the time of its molding. The present invention has been completed on the basis of such findings.

That is, the present invention provides the following polycarbonate resin composition pellet and method of producing the pellet.

<1> A polycarbonate resin composition pellet, which has a light transmittance at a wavelength of 380 nm of 97.0% or more when the light transmittance is measured by using a methylene chloride solution having a concentration of 12 g/dL, the solution being charged into a quartz glass cell having an optical path length of 5 cm, and which has a viscosity-average molecular weight (Mv) of from 11,000 to 22,000.

<2> The polycarbonate resin composition pellet according to the above-mentioned item <1>, in which the pellet is produced while a ratio Q/Ns of a resin supply quantity Q (kg/h) of a kneading machine to be used at a time of the production of the pellet to a screw revolution number Ns (rpm) of the kneading machine is controlled within a proper range in consideration of a balance between a retention time and a shear to be applied to a resin.

<3> The polycarbonate resin composition pellet according to the above-mentioned item <1> or <2>, in which the pellet contains at least one component selected from the group consisting of the following components (A) to (F) with respect to 100 parts by mass of a resin component:

(A) 0.01 to 0.3 parts by mass of an organopolysiloxane compound having at least one kind of functional group selected from a phenyl group, an alkoxy group, and a vinyl group;

(B) 0.01 to 0.10 parts by mass of at least one kind of antioxidant selected from phosphorous acid esters each represented by the following general formula (I-1):

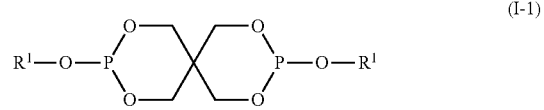

in the formula, $R^1$'s each represent an aryl group or an alkyl group, and may be identical to or different from each other;

(C) 0.01 to 0.10 parts by mass of at least one kind of release agent selected from fatty acid monoglycerides each having 16 to 30 carbon atoms;

(D) 0.1 to 5 parts by mass of a polyoxytetramethylene-polyoxyethylene glycol represented by the following general formula (II):

$$HO(CH_2CH_2CH_2CH_2O)_m(CH_2CH_2O)_nH \quad (II)$$

in the formula, m and n each independently represent an integer of from 4 to 60, and m+n represents an integer of from 20 to 90;

(E) 0.01 to 0.03 parts by mass of an alicyclic epoxy compound; and (F) 0.01 to 1 parts by mass of an acrylic resin having a molecular weight of from 200 to 100,000.

<4> The polycarbonate resin composition pellet according to any one of the above-mentioned items <1> to <3>, in which the phosphorous acid ester represented by the general formula (I-1) includes a compound represented by the following general formula (I-2):

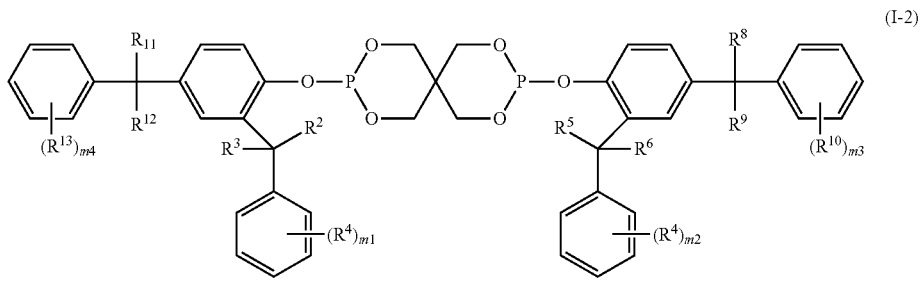
(I-2)

in the formula (I-2), $R^2$, $R^3$, $R^5$, $R^6$, $R^8$, $R^9$, $R^{11}$, and $R^{12}$ each independently represent a hydrogen atom or an alkyl group, $R^4$, $R^7$, $R^{19}$, and $R^{13}$ each independently represent an alkyl group, an aryl group, or an aralkyl group, and m1 to m4 each independently represent an integer of from 0 to 3.

<5> The polycarbonate resin composition pellet according to any one of the above-mentioned items <1> to <4>, in which a resin component of a polycarbonate resin composition contains a copolymer, which has respective repeating units represented by the following general formulae (III) and (IV), and whose content of the repeating unit represented by the following general formula (IV) is from 1 to 10 mass %, at from 5 to 70 mass % in the resin component:

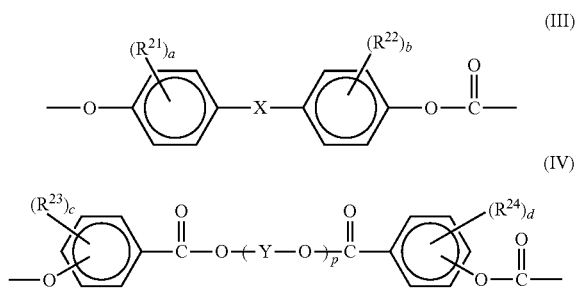

in the formulae, $R^{21}$ and $R^{22}$ each independently represent an alkyl group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, —CO—, or a bond represented by the following formula (V-1) or (V-2), $R^{23}$ and $R^{24}$ each independently represent an alkyl group having 1 to 3 carbon atoms, Y represents a linear or branched alkylene group having 2 to 15 carbon atoms, a to d each independently represent an integer of from 0 to 4, and p represents an integer of from 2 to 200.

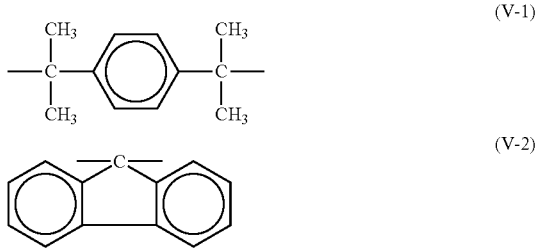

<6> A method of producing a polycarbonate resin composition pellet having a light transmittance at a wavelength of 380 nm of 97.0% or more when the light transmittance is measured by using a methylene chloride solution having a concentration of 12 g/dL, the solution being charged into a quartz glass cell having an optical path length of 5 cm, the method including kneading and granulating a polycarbonate resin composition while controlling a ratio Q/Ns of a resin supply quantity Q (kg/h) of a kneading machine to a screw revolution number Ns (rpm) of the kneading machine within such a range that deterioration of a color tone due to thermal hysteresis at a time of melting and kneading is suppressed.

<7> The method of producing a polycarbonate resin composition pellet according to the above-mentioned item <6>, in which the kneading is performed under such a condition that the polycarbonate resin composition before the granulation into the pellet has a solution transmittance at a wavelength of 380 nm of 98.0% or more, and a reduction amount of the transmittance in the kneading and granulating step is 1.0% or less.

<8> A light-guiding member, which is obtained by molding the polycarbonate resin composition pellet according to any one of the above-mentioned items <1> to <5>.

Advantageous Effects of Invention

The polycarbonate resin composition pellet of the present invention is reduced in yellow tinge even when an additive such as a bluing agent is not incorporated, and has a high light transmittance in a short wavelength region. A light-guiding member excellent in color tone uniformity can be provided by molding the light-guiding member out of the pellet of the present invention.

In addition, according to the method of the present invention, there can be provided a polycarbonate resin composition pellet having a high light transmittance in a short wavelength region and having an excellent color tone.

DESCRIPTION OF EMBODIMENTS

A polycarbonate resin composition pellet of the present invention has a light transmittance at a wavelength of 380 nm of 97.0% or more when the light transmittance is measured by using a methylene chloride solution having a concentration of 12 g/dL, the solution being charged into a quartz glass cell having an optical path length of 5 cm, and has a viscosity-average molecular weight (Mv) of from 11,000 to 22,000.

In ordinary cases, the measurement of the transmittance of a resin or a resin composition is often performed by using its injection-molded article. However, as described above, according to the findings of the inventors of the present invention, the light transmittance of a polycarbonate resin composition in a short wavelength region is largely influenced by thermal hysteresis at the time of the kneading of the polycarbonate resin composition and at the time of its molding. That is, the thermal deterioration of the composition may occur at the time of its molding into an injection-molded article, and its light transmittance may be influenced by another factor such as molding strain. Accordingly, the very polycarbonate resin composition needs to be quantitatively evaluated for its transmittance by a method that is not subjected to any thermal hysteresis.

Therefore, in the present invention, the polycarbonate resin composition is dissolved in methylene chloride to prepare a methylene chloride solution having a concentration of 12 g/dL, and the solution is charged into a quartz glass cell having an optical path length of 5 cm (a width of 1 cm), followed by the measurement of the light transmittance. Thus, the resin composition before its granulation into the pellet and the very pellet can be evaluated for their optical characteristics while a molding factor is eliminated.

In addition, in the present invention, a light transmittance at a wavelength of 380 nm is measured as the light transmittance in the short wavelength region from the viewpoint of evaluating a color difference between a light incidence portion and anti-light incidence portion in a light-guiding member.

Specifically, the light transmittance in the present invention is measured in accordance with the following method.
(Method of Measuring Solution Transmittance)

6.0 Grams of a PC pellet are weighed in a flask. Then, methylene chloride is poured into the flask so that the total volume may become 50.0 mL, and the mixture is stirred until the PC is completely dissolved (concentration: 12 g/dL). The solution in which the PC has been completely dissolved and which has no concentration unevenness is charged into a transparent cell made of quartz glass having an optical path length of 5 cm and a width of 1 cm, and its light transmittance at a wavelength of 300 to 800 nm is measured. It should be noted that the light transmittance of pure methylene chloride is also measured and the value is defined as a reference corresponding to a light transmittance of 100%.

The measurement is preferably performed at 25° C. or less from the viewpoint of the performance of stable measurement. From the same viewpoint, the measurement cell is sufficiently washed and sufficient attention is paid to a measurement environment so that dust may not intrude.

A deuterium lamp is used as a light source for a wavelength of 300 to 359 nm and a halogen lamp is used as a light source for a wavelength of 360 to 800 nm.

In general, the light transmittance of a PC for a light-guiding member does not extremely change in the middle to long wavelength region of visible light ranging from 500 to 800 nm even when the light-guiding performance of the pellet changes. However, a short wavelength region of 500 nm or less reflects the color tone of the pellet. In the present invention, a light transmittance at 380 nm as the shortest wavelength of visible light at which a transmittance difference between samples was easily reflected was selected out of such transmittances and used as an indicator of a light-guiding characteristic.

When the concentration of the solution is higher than 12 g/dL, a large significant difference in color tone between the samples can be detected. However, concentration unevenness is liable to occur owing to the volatilization of methylene chloride in the solution, and hence the stability of the measurement is poor. In addition, the solution needs to be left at rest for a long time period after its pouring into the cell. On the other hand, when the concentration of the solution is lower than 12 g/dL, stable measurement can be performed because the concentration unevenness as a factor for the destabilization of the measurement hardly occurs. However, a significant difference in color tone between the samples that can be observed in the measurement is small. Accordingly, the concentration of the solution to be used in the measurement of the light transmittance in the present invention was set to 12 g/dL.

The polycarbonate resin composition pellet of the present invention has a light transmittance at a wavelength of 380 nm measured by the above-mentioned method of 97.0% or more, preferably 97.5% or more, more preferably 97.8% or more, still more preferably 98.0% or more from the viewpoint of the color tone. From the viewpoint of the color tone, the light transmittance is preferably as high as possible, and its upper limit is not particularly limited.

The polycarbonate resin composition in the present invention preferably contains at least one component selected from the group consisting of the following components (A) to (F) with respect to 100 parts by mass of a resin component:

(A) 0.01 to 0.3 parts by mass of an organopolysiloxane compound having at least one kind of functional group selected from a phenyl group, an alkoxy group, and a vinyl group;

(B) 0.01 to 0.10 parts by mass of at least one kind of antioxidant selected from phosphorous acid esters each represented by the following general formula (I-1):

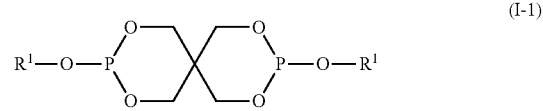

(I-1)

in the formula, $R^1$'s each represent an aryl group or an alkyl group, and may be identical to or different from each other;

(C) 0.01 to 0.10 parts by mass of at least one kind of release agent selected from fatty acid monoglycerides each having 16 to 30 carbon atoms;

(D) 0.1 to 5 parts by mass of a polyoxytetramethylene-polyoxyethylene glycol represented by the following general formula (II):

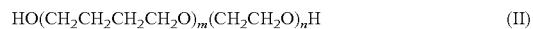

$HO(CH_2CH_2CH_2CH_2O)_m(CH_2CH_2O)_nH$ (II)

in the formula, m and n each independently represent an integer of 4 to 60, and m+n represents an integer of 20 to 90;

(E) 0.01 to 0.03 parts by mass of an alicyclic epoxy compound; and (F) 0.01 to 1 parts by mass of an acrylic resin having a molecular weight of 200 to 100,000.

The organopolysiloxane compound as the component (A) is a reactive silicone-based compound obtained by providing a silicone-based compound with at least one kind of functional group selected from a phenyl group, an alkoxy group, and a vinyl group.

The organopolysiloxane compound has only to have at least one kind of functional group selected from a phenyl group, an alkoxy group, and a vinyl group, and out of such compounds, a compound having a kinematic viscosity at 25° C. of about 1 to 500 cSt is preferred.

The component (A) is a compound that acts as a stabilizer in a PC-based resin, and the blending of the component (A) can prevent external appearance failures such as yellowing and silver (silver streak) due to the thermal deterioration of the pellet at the time of its molding, and the inclusion of air bubbles.

In the formula (I-a), $R^{1a}$ represents an alkyl group having 1 to 10 carbon atoms. In the formula (I-b), $R^{1b}$ represents an alkyl group having 1 to 10 carbon atoms.

The phosphorous acid ester represented by the general formula (I-1) is preferably a compound represented by the following general formula (I-2).

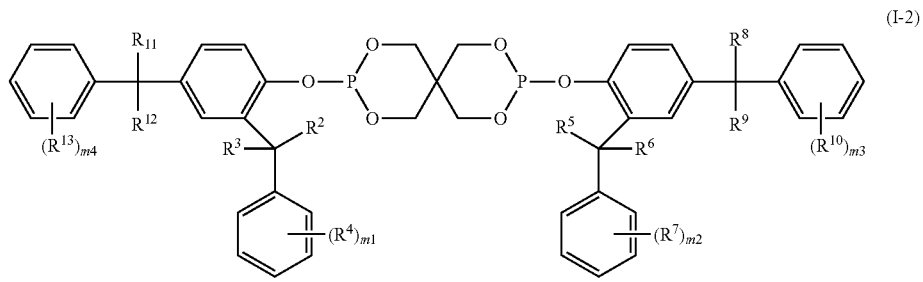

(I-2)

Examples of a compound that can be used as the organopolysiloxane compound having at least one kind of functional group selected from a phenyl group, an alkoxy group, and a vinyl group include, but not limited to, a KR-511 and KR-9218 as commercial products (both manufactured by Shin-Etsu Chemical Co., Ltd., trade names).

The blending amount of the component (A) is preferably 0.01 to 0.3 parts by mass, more preferably 0.05 to 0.2 parts by mass with respect to 100 parts by mass of the resin component. When the amount is excessively small, its effect as a stabilizer is insufficient. When the amount is excessively large, clouding occurs.

The phosphorous acid ester as the component (B) is a phosphorous acid ester represented by the general formula (I-1) and is a compound that acts as an antioxidant.

In the general formula (I-1), the alkyl group represented by $R^1$ is preferably a linear or branched alkyl group having 1 to 10 carbon atoms. When $R^1$ represents an aryl group, $R^1$ preferably represents an aryl group represented by any one of the following general formulae (I-a), (I-b), and (I-c).

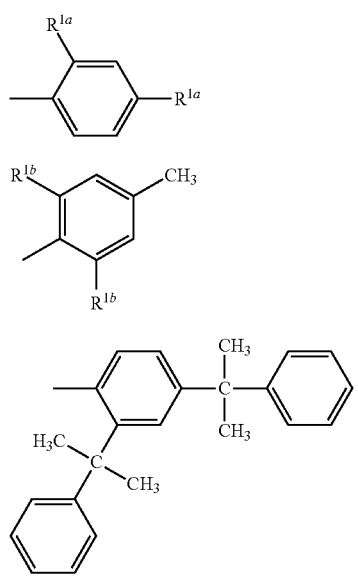

In the formula (I-2), $R^2$, $R^3$, $R^5$, $R^6$, $R^8$, $R^9$, $R^{11}$, and $R^{12}$ each independently represent a hydrogen atom or an alkyl group, $R^4$, $R^7$, $R^{10}$, and $R^{13}$ each independently represent an alkyl group, an aryl group, or an aralkyl group, and m1 to m4 each independently represent an integer of 0 to 3. $R^2$, $R^3$, $R^5$, $R^6$, $R^8$, $R^9$, $R^{11}$, and $R^{12}$ each preferably represent a methyl group, and m1 to m4 each preferably represent 0.

As the phosphorous acid ester as the component (B), there can be used commercial products, i.e., ADK STAB PEP36 and ADK STAB PEP-8 (both of which are manufactured by ADEKA, trade names), Weston 618 and Weston 619G (both of which are manufactured by GE, trade names), and Doverphos S-9228PC (manufactured by Dover Chemical Corporation, trade name). However, the ester is not limited thereto.

The blending amount of the component (B) is preferably 0.01 to 0.10 parts by mass, more preferably 0.03 to 0.08 parts by mass with respect to 100 parts by mass of the resin component. When the amount is excessively small, its anti-oxidizing effect is insufficient. When the amount is excessively large, no improvement in anti-oxidizing effect is observed.

The release agent as the component (C) is at least one kind selected from the fatty acid monoglycerides each having 16 to 30 carbon atoms. A specific example of the fatty acid monoglycerides each having 16 to 30 carbon atoms is stearic acid monoglyceride.

Although a fatty acid monoglyceride is suitably used as the release agent because the monoglyceride has chargeability as well as releasability, a fatty acid full ester can also be used.

The blending amount of the component (C) is preferably 0.01 to 0.10 parts by mass, more preferably 0.03 to 0.05 parts by mass with respect to 100 parts by mass of the resin component. When the amount is excessively small, its releasability is not sufficiently expressed. When the amount is excessively large, the color tone stability of the pellet at the time of its high-temperature molding reduces.

The polyoxytetramethylene-polyoxyethylene glycol as the component (D) is a compound represented by the general formula (II).

In the general formula (II), m and n each independently represent an integer of 4 to 60, and m+n represents an integer of 20 to 90. It is preferred that m represent 10 to 40, n represent 10 to 40, and m+n represent 20 to 80, and it is more preferred that m represent 15 to 35, n represent 15 to 35, and m+n represent 30 to 70.

The blending amount of the component (D) is preferably 0.1 to 5 parts by mass, more preferably 0.1 to 1.2 parts by mass with respect to 100 parts by mass of the resin component from the viewpoint of a color tone-improving effect.

The alicyclic epoxy compound as the component (E) refers to a cyclic aliphatic compound having an alicyclic epoxy group, i.e., such an epoxy group that one oxygen atom is added to an ethylene bond in an aliphatic ring. Specifically, compounds represented by the following formulae (1) to (10) described in JP 11-158364 A are each suitably used.

(1)
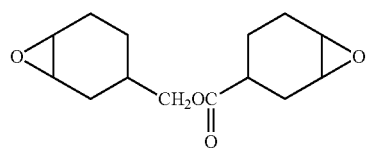

(2)
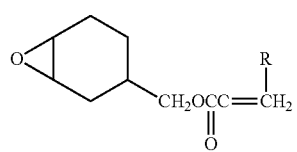
(R: H or CH$_3$)

(3)
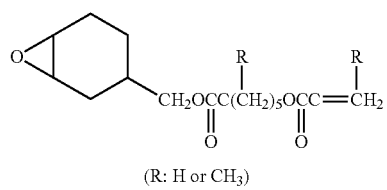
(R: H or CH$_3$)

(4)
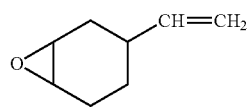

(5)
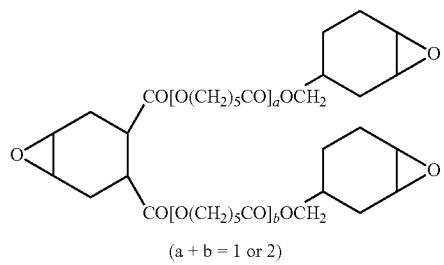
(a + b = 1 or 2)

(6)
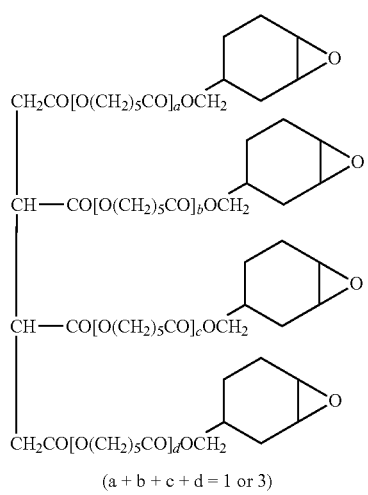
(a + b + c + d = 1 or 3)

(7)
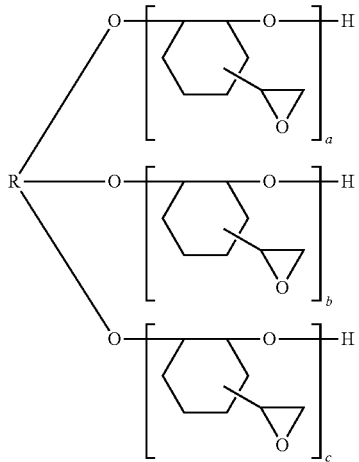
(a + b + c = n (integer), R: hydrocarbon group)

(8)
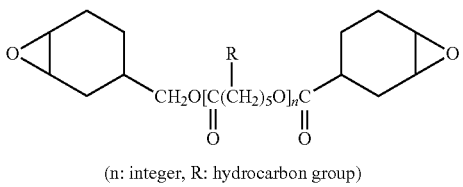
(n: integer, R: hydrocarbon group)

(9)
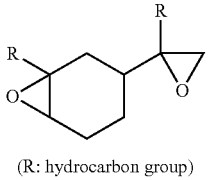
(R: hydrocarbon group)

(10)
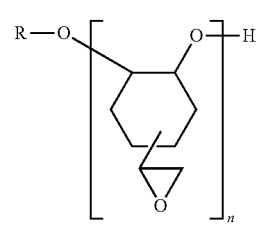
(n: integer, R: hydrocarbon group)

Of the alicyclic epoxy compounds, the compound represented by the formula (I), the formula (7), or the formula (10) is more preferably used because the compound is excellent in compatibility with the PC-based resin and does not impair its transparency.

The blending of the alicyclic epoxy compound into the polycarbonate resin can improve its hydrolysis resistance.

The blending amount of the alicyclic epoxy compound as the component (E) is 0.01 to 0.03 parts by mass with respect to 100 parts by mass of the resin component.

The acrylic resin as the component (F) refers to a polymer containing, as a repeating unit, at least one kind of monomer unit selected from acrylic acid, an acrylic acid ester, acrylonitrile, and derivatives thereof, and refers to a homopolymer or a copolymer with, for example, styrene or butadiene. Specific examples thereof include polyacrylic acid, polymethyl methacrylate (PMMA), polyacrylonitrile, an ethyl acrylate-2-chloroethyl acrylate copolymer, an acrylic acid-n-butyl-acrylonitrile copolymer, an acrylonitrile-styrene copolymer, an acrylonitrile-butadiene copolymer, and an acrylonitrile-butadiene-styrene copolymer. Of those, polymethyl methacrylate (PMMA) can be particularly suitably used.

The acrylic resin as the component (F) needs to have a molecular weight of 200 to 100,000, and its molecular weight is preferably 20,000 to 60,000. When the molecular weight is 200 to 100,000, phase separation between the PC copolymer and any other PC resin, and the acrylic resin does not become excessively fast at the time of the molding, and hence sufficient transparency is obtained in a molded article. Although a known compound can be used as the polymethyl methacrylate (PMMA), a compound produced by subjecting a methyl methacrylate monomer to bulk polymerization in the presence of a peroxide and an azo-based polymerization initiator is preferred in ordinary cases.

The blending amount of the component (F) is preferably 0.01 to 1 parts by mass, more preferably 0.05 to 0.5 parts by mass, still more preferably 0.1 to 0.3 parts by mass with respect to 100 parts by mass of the resin component. When the blending amount of the acrylic resin is 0.01 parts by mass or more, the transparency of the molded article improves. When the amount is 1 part by mass or less, the transparency can be maintained without the impairment of the other desired physical properties.

The resin component of the polycarbonate resin composition in the present invention may be a single polycarbonate resin, or may be a mixture of two or more kinds of polycarbonate resins. The polycarbonate resin, which is not particularly limited, is preferably a bisphenol A polycarbonate resin using bisphenol A as a raw material.

In addition, the polycarbonate resin may be a copolymer, and a phenol-modified diol-copolymerized polycarbonate which has respective repeating units represented by the following general formulae (III) and (IV), and whose content of the repeating unit represented by the following general formula (IV) is 1 to 10 mass % can be used from the viewpoint of the color tone.

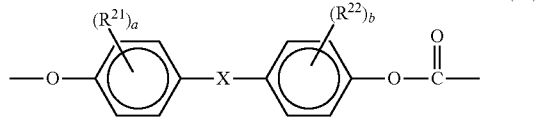

(III)

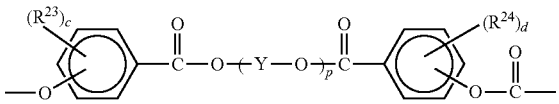

(IV)

In the formulae, $R^{21}$ and $R^{22}$ each independently represent an alkyl group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, —CO—, or a bond represented by the following formula (V-1) or (V-2), $R^{23}$ and $R^{24}$ each independently represent an alkyl group having 1 to 3 carbon atoms, Y represents a linear or branched alkylene group having 2 to 15 carbon atoms, a to d each independently represent an integer of 0 to 4, and p represents an integer of 2 to 200.

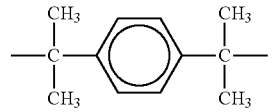

(V-1)

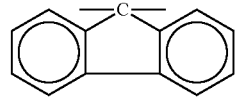

(V-2)

The copolymer can be obtained by copolymerizing a dihydric phenol and phenol-modified diol to be described later according to an interfacial polymerization method. Specifically, for example, in an inert solvent such as methylene chloride, the dihydric phenol, the phenol-modified diol, and a carbonate precursor such as phosgene are caused to react with one another in the presence of a known acid acceptor or molecular weight modifier by further adding a catalyst or a branching agent as required.

Examples of the dihydric phenol can include compounds each represented by the following general formula (III-a).

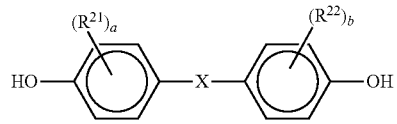

(III-a)

In the general formulae (III) and (III-a), $R^{21}$ and $R^{22}$ each independently represent an alkyl group having 1 to 6 carbon atoms. The alkyl group may be any one of the linear, branched, and cyclic groups. Specific examples of the alkyl group can include a methyl group, an ethyl group, an n-propyl group, an isopropyl group, an n-butyl group, an isobutyl group, a tert-butyl group, an n-pentyl group, an isopentyl group, an n-hexyl group, an isohexyl group, a cyclopentyl group, and a cyclohexyl group. a and b represent the substitution numbers of $R^{21}$ and $R^{22}$, respectively, and each represent an integer of 0 to 4. It should be noted that when a plurality of $R^{21}$'s exist, the plurality of $R^{21}$'s may be identical to or different from each other, and when a plurality of $R^{22}$'s exist, the plurality of $R^{22}$'s may be identical to or different from each other.

In the general formulae (III) and (III-a), X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, —CO—, or a bond represented by the formula (V-1) or (V-2).

Examples of the alkylene group having 1 to 8 carbon atoms include a methylene group, an ethylene group, a propylene group, a butylene group, a pentylene group, and a hexylene group. Examples of the alkylidene group having 2 to 8 carbon atoms include an ethylidene group and an isopropylidene group. Examples of the cycloalkylene group having 5 to 15 carbon atoms include a cyclopentylene group and a cyclohexylene group. Examples of the cycloalkylidene group having 5 to 15 carbon atoms include a cyclopentylidene group and a cyclohexylidene group.

Various phenols are available as the dihydric phenol represented by the general formula (III-a). Of those, 2,2-bis (4-hydroxyphenyl)propane [common name: bisphenol A] is particularly suitable.

As a bisphenol other than bisphenol A, there are given, for example bis(hydroxyaryl)alkanes, bis(hydroxyaryl)cycloalkanes, dihydroxyaryl ethers, dihydroxydiaryl sulfides, dihydroxydiaryl sulfoxides, dihydroxydiaryl sulfones, dihydroxydiphenyls, dihydroxydiarylfluorenes, dihydroxydiaryladamantanes, bis(4-hydroxyphenyl)diphenylmethane, 4,4'-[1,3-phenylenebis(1-methylethylidene)] bisphenol, 10,10-bis(4-hydroxyphenyl)-9-anthrone, 1,5-bis(4-hydroxyphenylthio)-2,3-dioxapentaene, and an α,ω-bishydroxyphenylpolydimethylsiloxane compound.

Specific examples of the bis(hydroxyaryl)alkanes include: bis(4-hydroxyphenyl)methane; 1,1-bis(4-hydroxyphenyl) ethane; 2,2-bis(4-hydroxyphenyl)butane; 2,2-bis(4-hydroxyphenyl)octane; 2,2-bis(4-hydroxyphenyl)phenylmethane; 2,2-bis(4-hydroxy-3-methylphenyl)propane; bis(4-hydroxyphenyl)naphthylmethane; 1,1-bis(4-hydroxy-t-buthylphenyl)propane; 2,2-bis(4-hydroxy-3-bromophenyl) propane; 2,2-bis(4-hydroxy-3,5-tetramethylphenyl)propane; 2,2-bis(4-hydroxy-3-chlorophenyl)propane; 2,2-bis(4-hydroxy-3,5-tetrachlorophenyl)propane; and 2,2-bis(4-hydroxy-3,5-tetrabromophenyl)propane.

Specific examples of the bis(hydroxyaryl)cycloalkanes include: 1,1-bis(4-hydroxyphenyl)cyclopentane; 1,1-bis(4-hydroxyphenyl)cyclohexane; 1,1-bis(4-hydroxyphenyl)-3,5,5-trimethylcyclohexane; and 2,2'-bis(4-hydroxyphenyl)norbornene.

Specific examples of the dihydroxydiaryl ethers include: 4,4'-dihydroxydiphenyl ether; and 4,4'-dihydroxy-3,3'-dimethyldiphenyl ether.

Specific examples of the dihydroxydiaryl sulfides include: 4,4'-dihydroxydiphenyl sulfide; and 4,4'-dihydroxy-3,3'-dimethyldiphenyl sulfide.

Specific examples of the dihydroxydiaryl sulfoxides include:
4,4'-dihydroxydiphenyl sulfoxide; and 4,4'-dihydroxy-3,3'-dimethyldiphenyl sulfoxide.

Specific examples of the dihydroxydiaryl sulfones include:
4,4'-dihydroxydiphenyl sulfone; and 4,4'-dihydroxy-3,3'-dimethyldiphenyl sulfone.

A specific example of the dihydroxydiphenyls is 4,4'-dihydroxydiphenyl.

Specific examples of the dihydroxydiarylfluorenes include:
9,9-bis(4-hydroxyphenyl)fluorene; and 9,9-bis(4-hydroxy-3-methylphenyl)fluorene.

Specific examples of the dihydroxydiaryladamantanes include:
bis(4-hydroxyphenyl)diphenylmethane; 1,3-bis(4-hydroxyphenyl)adamantane; 2,2-bis(4-hydroxyphenyl)adamantane; and 1,3-bis(4-hydroxyphenyl)-5,7-dimethyladamantane.

One kind of those dihydric phenols may be used alone, or two or more kinds thereof may be mixed and used.

Examples of the phenol-modified diol can include compounds each represented by the following general formula (IV-a).

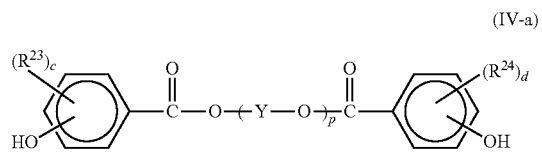

(IV-a)

In the general formulae (IV) and (IV-a), $R^{23}$ and $R^{24}$ each independently represent an alkyl group having 1 to 3 carbon atoms, and examples thereof include a methyl group, an ethyl group, an n-propyl group, and an isopropyl group. c and d represent the substitution numbers of $R^{23}$ and $R^{24}$, respectively, and each represent an integer of 0 to 4. It should be noted that when a plurality of $R^{23}$'s exist, the plurality of $R^{23}$'s may be identical to or different from each other, and when a plurality of $R^{24}$'s exist, the plurality of $R^{24}$'s may be identical to or different from each other.

In the general formulae (IV) and (IV-a), Y represents a linear or branched alkylene group having 2 to 15 carbon atoms. Examples of the linear or branched alkylene group having 2 to 15 carbon atoms include: alkylene groups such as an ethylene group, a propylene group, a butylene group, an isobutylene group, a pentylene group, and an isopentylene group; and alkylidene residues such as an ethylidene group, a propylidene group, an isopropylidene group, a butylidene group, an isobutylidene group, a pentylidene group, and an isopentylidene group. p represents an integer of 2 to 200, preferably 6 to 70.

The phenol-modified diol represented by the general formula (IV-a) is, for example, a compound derived from hydroxybenzoic acid, or an alkyl ester or acid chloride thereof and a polyether diol. Although the phenol-modified diol can be synthesized by a method proposed in, for example, JP 62-79222 A, JP 60-79072 A, or JP 2002-173465 A, the phenol-modified diol obtained by any such method is desirably purified as appropriate. A method for the purification is desirably, for example, a method involving reducing a pressure in a system in the latter stage of the reaction and removing an excess raw material (such as p-hydroxybenzoic acid) by distillation, or a method involving washing the phenol-modified diol with water, an alkali aqueous solution (such as an aqueous solution of sodium hydrogen carbonate), or the like.

Typical examples of the hydroxybenzoic acid alkyl ester include a hydroxybenzoic acid methyl ester and a hydroxybenzoic acid ethyl ester. The polyether diol is represented by HO—(Y—O)$_p$—H, and is formed by the repetition of a linear or branched alkyl ether having 2 to 15 carbon atoms. Specific examples thereof include polyethylene glycol, polypropylene glycol, and polytetramethylene glycol. Of those, polytetramethylene glycol is particularly preferred from the viewpoints of availability and hydrophobicity. The repetition number p of the ether moieties of the polyether diol is preferably 2 to 200, more preferably 6 to 70. When p is 2 or more, the following advantage is obtained: efficiency upon copolymerization of the phenol-modified diol is good. When p is 70 or less, the following advantage is obtained: a reduction in heat resistance of the PC copolymer is small.

A typical example of the acid chloride is an acid chloride obtained from hydroxybenzoic acid and phosgene. More specifically, the acid chloride can be obtained by a method described in, for example, JP 2652707 B2. Hydroxybenzoic acid or the alkyl ester thereof, which may be any one of a para form, a meta form, and an ortho form, is preferably a para form in terms of a copolymerization reaction. The ortho form may be poor in reactivity of the copolymerization owing to steric hindrance on a hydroxyl group.

In the process of producing the PC copolymer, the phenol-modified diol is preferably used as a methylene chloride solution to the extent possible in order that its alteration or the like may be prevented. When the diol cannot be used as a methylene chloride solution, the diol can be used as an alkali aqueous solution such as NaOH.

Increasing the copolymerization amount of the phenol-modified diol in the PC copolymer improves its flowability but reduces its heat resistance. Therefore, the copolymerization amount of the phenol-modified diol is preferably selected in consideration of a balance between desired flowability and desired heat resistance. When the copolymerization amount of the phenol-modified diol is more than 40 mass %, as described in JP 62-79222 A, the copolymer is brought into an elastomer state and hence may be unable to find use in the same applications as those of a general PC resin. In order that resistance to heat at 100° C. or more may be maintained, the amount of a phenol-modified diol residue in the PC copolymer needs to be 1 to 30 mass % in the present invention, and the amount is preferably 1 to 20 mass %, more preferably 1 to 15 mass %.

Any molecular weight modifier can be used as long as the modifier is typically used in the polymerization of a PC resin.

Specific examples thereof include monohydric phenols such as phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol, tribromophenol, a monoalkylphenol having a linear or branched alkyl group having an average number of carbon atoms of 12 to 35 at the ortho-, meta-, or para-position, 9-(4-hydroxyphenyl)-9-(4-methoxyphenyl)fluorene, 9-(4-hydroxy-3-methylphenyl)-9-(4-methoxy-3-methylphenyl)fluorene, and 4-(1-adamantyl)phenol.

Of those monohydric phenols, p-t-butylphenol, p-cumylphenol, p-phenylphenol, or the like is preferably used.

As the catalyst, there can be preferably used, for example, a phase transfer catalyst such as a tertiary amine or a salt thereof, a quaternary ammonium salt, or a quaternary phosphonium salt. Examples of the tertiary amine include triethylamine, tributylamine, N,N-dimethylcyclohexylamine, pyridine, and dimethylaniline, and examples of the tertiary amine salt include hydrochloric acid salts or bromic acid salts of these tertiary amines. Examples of the quaternary ammonium salt include trimethylbenzylammonium chloride, triethylbenzylammonium chloride, tributylbenzylammonium chloride, trioctylmethylammonium chloride, tetrabutylammonium chloride, and tetrabutylammonium bromide. Examples of the quaternary phosphonium salt include tetrabutylphosphonium chloride and tetrabutylphosphonium bromide. One kind of those catalysts may be used alone, or two or more kinds thereof may be used in combination. Of the catalysts, a tertiary amine is preferred and triethylamine is particularly suitable.

Various solvents are available as the inert organic solvent. Examples thereof include:
chlorinated hydrocarbons such as dichloromethane (methylene chloride), trichloromethane, carbon tetrachloride, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, and chlorobenzene; toluene; and acetophenone. Each of those organic solvents may be used alone, or two or more kinds thereof may be used in combination. Of those, methylene chloride is particularly suitable.

For example, the following compound having three or more functional groups can be used as the branching agent: 1,1,1-tris(4-hydroxyphenyl)ethane, 4,4'-[1-[4-[1-(4-hydroxyphenyl)-1-methylethyl]phenyl]ethylidene]bisphenol, α,α',α''-tris(4-hydroxyphenyl)-1,3,5-triisopropylbenzene, 1-[α-methyl-α-(4'-hydroxyphenyl)ethyl]-4-[α',α'-bis(4''-hydroxyphenyl)ethyl]benzene, phloroglucin, trimellitic acid, or isatinbis (o-cresol).

The blending amount of the copolymer in the resin component is preferably 5 to 70 mass %, more preferably 15 to 60 mass %, still more preferably 20 to 50 mass % with respect to 100 mass % of the resin component from the viewpoint of the color tone-improving effect.

The polycarbonate resin composition may be blended with various additives in addition to the above-mentioned components as required as long as the effect of the present invention is not impaired. Examples of such various additives include a phosphorus-based antioxidant other than the component (B), a phenol-based antioxidant, a UV absorber such as a benzotriazole-based or benzophenone-based UV absorber, a light stabilizer such as a hindered amine-based light stabilizer, an internal lubricant such as an aliphatic carboxylic acid ester-based compound, a paraffin-based compound, a silicone oil, or polyethylene wax, a commonly used flame retardant, flame retardant aid, release agent, antistatic agent, and coloring agent. The blending amount of any such component, which is appropriately determined to fall within such a range that the effect of the present invention is not impaired, is, for example, about 0.01 to 1 parts by mass, preferably 0.05 to 0.3 parts by mass, more preferably 0.1 to 0.3 parts by mass with respect to 100 parts by mass of the resin component.

Examples of the phosphorus-based antioxidant other than the component (B) include triphenyl phosphite, diphenyl nonyl phosphite, diphenyl(2-ethylhexyl)phosphite, tris(2,4-di-t-butylphenyl)phosphite, trisnonylphenyl phosphite, diphenyl isooctyl phosphite, 2,2'-methylenebis(4,6-di-t-butylphenyl)octyl phosphite, diphenyl isodecyl phosphite, diphenyl mono(tridecyl)phosphite, phenyl diisodecyl phosphite, phenyl di(tridecyl)phosphite, tris(2-ethylhexyl)phosphite, tris(isodecyl)phosphite, tris(tridecyl)phosphite, dibutyl hydrogen phosphite, trilauryl trithiophosphite, tetrakis(2,4-di-t-butylphenyl)-4,4'-biphenylene diphosphonite, 4,4'-isopropylidenediphenol dodecyl phosphite, 4,4'-isopropylidenediphenol tridecyl phosphite, 4,4'-isopropylidenediphenol tetradecyl phosphite, 4,4'-isopropylidenediphenol pentadecyl phosphite, 4,4'-butylidenebis(3-methyl-6-t-butylphenyl)ditridecyl phosphite, 1,1,3-tris(2-methyl-4-di-tridecyl phosphite-5-t-butylphenyl)butane, 3,4,5,6-dibenzo-1,2-oxaphosphane, triphenylphosphine, diphenylbutylphosphine, diphenyloctadecylphosphine, tris-(p-tolyl)phosphine, tris-(p-nonylphenyl)phosphine, tris-(naphthyl)phosphine, diphenyl-(hydroxymethyl)-phosphine, diphenyl-(acetoxymethyl)-phosphine, diphenyl-(β-ethylcarboxyethyl)-phosphine, tris-(p-chlorophenyl)phosphine, tris-(p-fluorophenyl)phosphine, diphenylbenzylphosphine, diphenyl-β-cyanoethylphosphine, diphenyl-(p-hydroxyphenyl)-phosphine, diphenyl-1,4-dihydroxyphenyl-2-phosphine, and phenylnaphthylbenzylphosphine.

Examples of the phosphorus-based antioxidant other than the component (B) can include commercial products such as Irgafos 168, Irgafos 12, and Irgafos 38 (all of which are manufactured by BASF, trade names), ADK STAB C and ADK STAB 329K (both of which are manufactured by ADEKA, trade names), JC263 (manufactured by JOHOKU CHEMICAL CO., LTD., trade name), Sardstab P-EPQ (manufactured by Clariant, trade name), and Weston 624 (manufactured by GE, trade name).

Examples of the phenol-based antioxidant include hindered phenols such as n-octadecyl-3-(3,5-di-t-butyl-4-hydroxyphenyl)propionate, 2,6-di-t-butyl-4-methylphenol, 2,2'-methylenebis(4-methyl-6-t-butylphenol), and pentaerythrityl-tetrakis[3-(3,5-di-t-butyl-4-hydroxyphenyl)propionate].

Examples of the phenol-based antioxidant can include commercial products such as Irganox 1010, Irganox 1076, Irganox 1330, Irganox 3114, and Irganox 3125 (all of which are manufactured by BASF, trade names), BHT (manufactured by Takeda Pharmaceutical Company Limited, trade name), Cyanox 1790 (manufactured by Cyanamid, trade name), and Sumilizer GA-80 (manufactured by Sumitomo Chemical Company Limited, trade name).

In the present invention, the thermal deterioration of the polycarbonate resin composition needs to be alleviated by reducing thermal hysteresis at the time of its kneading and at the time of its molding.

In the present invention, the thermal deterioration is alleviated as follows: the thermal hysteresis at the time of the kneading of the polycarbonate resin composition and at the time of its molding is reduced by controlling a ratio Q/Ns of a resin supply quantity Q (kg/h) of a kneading machine to be used at the time of the production of the pellet to a screw revolution number Ns (rpm) of the kneading machine within a proper range in consideration of a balance between a retention time and a shear to be applied to a resin. Here, the Q/Ns cannot be specified in the same Q/Ns range for all extruders because the ratio largely fluctuates depending on the output, screw diameter, screw dimensions, temperature condition, and ejection amount of an extruder to be used.

For example, in Examples to be described later, a strand was formed and a pellet was granulated as follows:
(1) in a biaxial kneader having a ratio "screw length/screw diameter" (L/D) of 31.5 (trade name: "TEX65αII", manufactured by The Japan Steel Works, Ltd.),
(2) a single screw having a layout such as a wide full flight, full flight, or neutral layout was used,
(3) a temperature in the range of from a cylinder to a die was set to 220° C. to 270° C., and
(4) an ejection amount was set to 800 to 1,000 kg/hr.

The solution transmittance of a polycarbonate flake used as a raw material and the solution transmittance of the resultant pellet were measured, and their difference was calculated. As a result, the following tendency was observed: as the thermal hysteresis which the pellet had received enlarged, the solution transmittance of the pellet reduced and hence its color tone deteriorated. In view of the foregoing, the Q/Ns was controlled within the range (1.85 to 1.95) in which a reduction in solution transmittance of each of the flake and the pellet was minimized, and the injection YI of a plate having a thickness of 3 mm finally reduced while the screw revolution number Ns was changed. Thus, a pellet suppressed in deterioration of its color tone and reduced in yellow tinge (excellent in color tone) was able to be obtained.

As described in the foregoing, the Q/Ns controlled within the range of from 1.85 to 1.95 cannot be applied to all extruders.

In general, a color tone is measured by molding a plate having a certain thickness, e.g., a thickness of 3 mm. However, the color tone of a flake thus measured is a color tone that has already been subjected to thermal hysteresis at the time of the molding of the plate. The color tone of the pellet is also a color tone that has been subjected to thermal hysteresis at the time of the molding of the plate as well as thermal hysteresis at the time of the granulation of the pellet. The thermal hysteresis at the time of the molding of the plate cannot be eliminated by the method. In view of the foregoing, in the present invention, a method of measuring a solution transmittance was devised, and an extrusion condition was optimized so that the thermal hysteresis of the granulation of the pellet was suppressed to the minimum while the thermal hysteresis due to the molding of the plate was eliminated.

From the viewpoint of producing a polycarbonate resin composition pellet having a light transmittance at a wavelength of 380 nm measured by the above-mentioned method of 97.0% or more, the kneading is preferably performed under such a condition that the polycarbonate resin composition before the granulation into the pellet has a solution transmittance at a wavelength of 380 nm of 98.0% or more, and the reduction amount of the transmittance in the kneading and granulating step is 1.0% or less.

EXAMPLES

The present invention is described more specifically by way of Examples below but the present invention is by no means limited to Examples below.

[Measurement of Viscosity-Average Molecular Weight (Mv)]

The viscosity of a methylene chloride solution at 20° C. was measured with an Ubbelohde viscometer and a limiting viscosity [η] was determined from the measurement, followed by the calculation of a molecular weight from the following equation.

$$[\eta] = 1.23 \times 10^{-5} Mv^{0.83}$$

[Measurement of Light Transmittance of Solution]

6.0 Grams of a PC pellet were weighed in a flask. Then, methylene chloride was poured into the flask so that the total volume became 50.0 mL, and the mixture was stirred until the PC was completely dissolved (concentration: 12 g/dL). The solution in which the PC had been completely dissolved and which had no concentration unevenness was charged into a transparent cell made of quartz glass having an optical path length of 5 cm and a width of 1 cm, and its light transmittance at a wavelength of 300 to 800 nm was measured with a spectrophotometer (manufactured by Shimadzu Corporation, trade name: "UV-2150"). It should be noted that the light transmittance of pure methylene chloride was also measured and the value was defined as a reference corresponding to a light transmittance of 100%.

A deuterium lamp is used as a light source for a wavelength of 300 to 359 nm and a halogen lamp is used as a light source for a wavelength of 360 to 800 nm.

In general, the light transmittance of a PC for a light-guiding member does not extremely change in the middle to long wavelength region of visible light ranging from 500 to 800 nm even when the light-guiding performance of the pellet changes. However, a short wavelength region of 500 nm or less reflects the color tone of the pellet. In the present invention, a light transmittance at 380 nm as the shortest wavelength of visible light at which a transmittance difference between samples was easily reflected was selected out of such transmittances and used as an indicator of a light-guiding characteristic.

The measurement is preferably performed at 25° C. or less from the viewpoint of the performance of stable measurement. From the same viewpoint, the measurement cell is sufficiently washed and sufficient attention is paid to a measurement environment so that dust may not intrude.

[Measurement of YI of Injection-Molded Article]

The PC pellet was subjected to injection molding at a cylinder temperature set to 280° C. for a cycle time of 40 seconds with a family die (a thermally stable die I was used as a nominal die) out of which the following molded articles could be taken: one 1-mm thick molded article of a rectangular plate shape measuring 25 mm by 35 mm, two 2-mm thick molded articles of the same shape as the foregoing, and one 3-mm thick molded article of the same shape as the foregoing. The yellow index (YI) of the 3-mm thick plate thus molded was determined with a spectrophotometer (manufactured by Hitachi High-Technologies Corporation, trade name: "U-4100") from the following equation.

$$YI(\text{yellow index})=100\times(1.28X-1.06Z)/Y$$

X, Y, and Z represent the tristimulus values of a C light source at a view angle of 2°.

[Evaluation of Light-Guiding Plate]

Light from an LED light source was caused to be incident through the end surface of a light-guiding plate having a diagonal length of 2.5 inches and a thickness of 0.4 mm molded out of the PC pellet at 340° C. to cause the plate to perform surface emission.

The x chromaticity and y chromaticity of an XYZ colorimetric system were measured at each of positions corresponding to ⅛ and ⅞ from the end surface of a light incidence portion (referred to as "light incidence portion" and "anti-light incidence portion," respectively) when the light-guiding plate was divided into 8 sections along the travelling direction of the light, and a difference in each of x chromaticity and y chromaticity between the light incidence portion and the anti-light incidence portion was measured.

Each component used in Examples and Comparative Examples is described below.

(1) Polycarbonate Resin

PC-1: bisphenol A polycarbonate resin, viscosity-average molecular weight (Mv)=11,400, manufactured by Idemitsu Kosan Co., Ltd.

PC-2: bisphenol A polycarbonate resin, viscosity-average molecular weight (Mv)=12,300, manufactured by Idemitsu Kosan Co., Ltd.

PC-3: bisphenol A polycarbonate resin, viscosity-average molecular weight (Mv)=14,500, manufactured by Idemitsu Kosan Co., Ltd.

PC-4: bisphenol A polycarbonate resin, viscosity-average molecular weight (Mv)=17,300, manufactured by Idemitsu Kosan Co., Ltd.

PC-5: bisphenol A polycarbonate resin, viscosity-average molecular weight (Mv)=19,200, manufactured by Idemitsu Kosan Co., Ltd.

PC-6: bisphenol A polycarbonate resin, viscosity-average molecular weight (Mv)=21,500, manufactured by Idemitsu Kosan Co., Ltd.

PC-7: bisphenol A polycarbonate resin, viscosity-average molecular weight (Mv)=23,500, manufactured by Idemitsu Kosan Co., Ltd.

PC-8: bisphenol A polycarbonate-polytetramethylene glycol copolymer (PC-PTMG), viscosity-average molecular weight (Mv)=12,700, copolymerization amount of phenol-modified diol: 4.0 mass %, manufactured by Idemitsu Kosan Co., Ltd.

(2) (A) Organopolysiloxane Compound

A-1: organopolysiloxane compound, trade name: "KR511", manufactured by Shin-Etsu Chemical Co., Ltd., refractive index=1.518

(3) (B) Phosphorous Acid Ester (Antioxidant)

B-1: bis(2,6-di-tert-butyl-4-methylphenyl)pentaerythritol diphosphite, trade name: "ADK STAB PEP36", manufactured by ADEKA CORPORATION B-2: bis(2,4-dicumylphenyl)pentaerythritol diphosphite, trade name: "Doverphos S-9228PC", manufactured by Dover Chemical Corporation (4) (C) Fatty Acid Monoglyceride (Release Agent)

C-1: stearic acid monoglyceride, trade name: "RIKEMAL S-100A", manufactured by RIKEN VITAMIN CO., LTD.

(5) (D) Polyoxytetramethylene-Polyoxyethylene Glycol (PEG-PTMG)

D-1: trade name: "POLYCERIN DC-3000E", manufactured by NOF CORPORATION, weight-average molecular weight: 3,000, m=26, n=26

D-2: trade name: "POLYCERIN DC-1800E", manufactured by NOF CORPORATION, weight-average molecular weight: 1,800, m=15, n=15

(6) (E) Alicyclic Epoxy Compound

E-1: 3,4-epoxycyclohexylmethyl-3',4'-epoxycyclohexanecarboxylate, trade name: "CELLOXIDE 2021P", manufactured by DAICEL CORPORATION (7) (F) Acrylic Resin Having Molecular Weight of 200 to 100,000

F-1: acrylic resin, trade name: "DIANAL BR83", manufactured by Mitsubishi Rayon Co., Ltd., Tg=75° C., weight-average molecular weight: 40,000

(8) Other

G-1: tris(2,4-di-t-butylphenyl)phosphite, phosphorus-based antioxidant, trade name: "Irgafos 168", manufactured by BASF Examples 1 to 17 and Comparative Examples 1 to 15

The respective raw materials were loaded into a biaxial kneader (trade name: "TEX65αII", manufactured by The Japan Steel Works, Ltd., ratio "screw length/screw diameter" (L/D)=31.5) according to formulation described in Table 1, a cylinder temperature was appropriately set to a proper value commensurate with the flowability of a resin, and the Q/Ns was controlled to a value described in Table 1, followed by the production of a polycarbonate resin composition pellet. Table 1 shows the results of its evaluations.

In each of Example 1 and Comparative Examples 1 to 4, a bisphenol A polycarbonate resin having an Mv of 11,400 was used as a resin component, the resin supply quantity Q was fixed to 1,000 kg/h, and the screw revolution number Ns was changed so that the Q/Ns became 1.4 to 2.4.

In each of Example 3 and Comparative Examples 5 to 8, a bisphenol A polycarbonate resin having an Mv of 14,500 was used as a resin component, the resin supply quantity Q was fixed to 800 kg/h, and the screw revolution number Ns was changed so that the Q/Ns became 1.4 to 2.4.

In each of Example 6 and Comparative Examples 9 to 12, a bisphenol A polycarbonate resin having an Mv of 17,300 was used as a resin component, the resin supply quantity Q was fixed to 1,000 kg/h, and the screw revolution number Ns was changed so that the Q/Ns became 1.4 to 2.4.

In addition, with regard to the pellet of each of Examples 3, 12, and 13, and Comparative Example 14, a light-guiding plate was produced, and a difference in each of x chromaticity and y chromaticity between the light incidence portion and anti-light incidence portion in the light-guiding plate was evaluated. Table 2 shows the results.

TABLE 1

| | No. | General name | | Example 1 | 2 | 3 | 4 | 5 | 6 | 7 | 8 |
|---|---|---|---|---|---|---|---|---|---|---|---|
| Formulation (resin) | PC-1 | Bisphenol A polycarbonate | Mv: 11,400 | 100 | | | | | | | |
| | PC-2 | | Mv: 12,300 | | 100 | | | | | | |
| | PC-3 | | Mv: 14,500 | | | 100 | 100 | 100 | | | |
| | PC-4 | | Mv: 17,300 | | | | | | 100 | | |
| | PC-5 | | Mv: 19,200 | | | | | | | 100 | |
| | PC-6 | | Mv: 21,500 | | | | | | | | 100 |
| | PC-7 | | Mv: 23,500 | | | | | | | | |
| | PC-8 | PC-PTMG copolymer | Mv: 12,700 | | | | | | | | |
| Formulation (additive) | A-1 | KR511 | Polyorganosiloxane compound | 0.10 | 0.10 | | 0.10 | | | 0.10 | 0.10 |
| | B-1 | ADK STAB PEP36 | Bis(2,6-di-tert-butyl-4-methylphenyl) pentaerythritol diphosphite | 0.05 | 0.05 | 0.05 | | | | | |
| | B-2 | Doverphos S-9228PC | Bis(2,4-di-cumylphenyl) pentaerythritol diphosphite | | | | 0.05 | 0.05 | | | |
| | C-1 | RIKEMAL S100A | Stearic acid monoglyceride | | | 0.03 | 0.03 | 0.03 | | | |
| | D-1 | POLYCERIN DC-3000E | Polyoxytetramethylene-polyoxyethylene glycol | | | | | | | | |
| | D-2 | POLYCERIN DC-1800E | | | | | | | | | |
| | E-1 | CELLOXIDE 2021P | 3,4-epoxycyclohexylmethyl-(3,4-epoxy)cyclohexane carboxylate | 0.02 | 0.02 | | | | | | |
| | F-1 | DIANAL BR83 | Acrylic resin | | | | | | 0.03 | 0.03 | 0.03 |
| | G-1 | Irg168 | Tris(2,4-di-t-butylphenyl)phosphite | | | 0.10 | 0.10 | 0.10 | 0.10 | 0.10 | 0.10 |
| Molecular weight | PC viscosity number | | ml/g | 33.4 | 36.5 | 40.4 | 40.4 | 40.4 | 46.5 | 50.6 | 56.1 |
| | Viscosity-average molecular weight (Mv) | | g/mol | 11,500 | 12,800 | 14,500 | 14,500 | 14,500 | 17,000 | 19,000 | 21,500 |
| Solution transmittance | % T at 380 nm | | % | 98.0 | 97.9 | 97.8 | 97.8 | 97.8 | 97.6 | 97.3 | 97.1 |
| Injection YI | Injection plate YI (molded at 280° C., 3-mm thick) | | — | 0.96 | 0.98 | 1.05 | 1.04 | 1.04 | 1.01 | 1.10 | 1.13 |
| Kneading condition | Resin supply quantity Q | | kg/h | 1,000 | 1,000 | 800 | 800 | 800 | 1,000 | 800 | 800 |
| | Screw revolution number Ns | | rpm | 530 | 522 | 422 | 422 | 423 | 526 | 423 | 423 |
| | Q/Ns | | kg/(h·rpm) | 1.9 | 1.9 | 1.9 | 1.9 | 1.9 | 1.9 | 1.9 | 1.9 |

| | No. | General name | | Example 9 | 10 | 11 | 12 | 13 | 14 | 15 | 16 | 17 |
|---|---|---|---|---|---|---|---|---|---|---|---|---|
| Formulation (resin) | PC-1 | Bisphenol A polycarbonate | Mv: 11,400 | 95 | 75 | | | | | | | |
| | PC-2 | | Mv: 12,300 | | | 50 | 40 | | | | | |
| | PC-3 | | Mv: 14,500 | | | | | 65 | 65 | | | |
| | PC-4 | | Mv: 17,300 | | | | | | | | | |
| | PC-5 | | Mv: 19,200 | | | | | | | 65 | | |
| | PC-6 | | Mv: 21,500 | | | | | | | | 100 | |
| | PC-7 | | Mv: 23,500 | | | | | | | | | 100 |
| | PC-8 | PC-PTMG copolymer | Mv: 12,700 | 5 | 25 | 50 | 60 | 35 | 35 | 35 | | |

TABLE 1-continued

| | | General name | | 1 | 2 | 3 | 4 | 5 | 6 | 7 | 8 |
|---|---|---|---|---|---|---|---|---|---|---|---|
| Formulation (additive) | A-1 | KR511 | Polyorganosiloxane compound | 0.10 | 0.10 | 0.10 | 0.10 | 0.05 | 0.10 | 0.10 | 0.10 |
| | B-1 | ADK STAB PEP36 | Bis(2,6-di-tert-butyl-4-methylphenyl) pentaerythritol diphosphate | 0.05 | 0.05 | 0.08 | 0.10 | 0.05 | 0.03 | 0.05 | 0.05 |
| | B-2 | Doverphos S-9228PC | Bis(2,4-di-cumylphenyl) pentaerythritol diphosphite | | | | | | | | |
| | C-1 | RIKEMAL S100A | Stearic acid monoglyceride | 0.03 | | 0.03 | | 0.03 | 0.03 | 0.03 | 0.03 |
| | D-1 | POLYCERIN DC-3000E | Polyoxytetramethylene-polyoxyethylene glycol | | | | | | | 1.0 | |
| | D-2 | POLYCERIN DC-1800E | | | | | | | | | 1.0 |
| | E-1 | CELLOXIDE 2021P | 3,4-epoxycyclohexylmethyl-(3,4-epoxy)cyclohexane carboxylate | 0.10 | 0.02 | 0.01 | | | 0.01 | | |
| | F-1 | DIANAL BR83 | Acrylic resin | | | | | 0.10 | | | |
| | G-1 | Irg168 | Tris(2,4-di-t-butylphenyl)phosphite | | | | | | | | |
| Molecular weight | | PC viscosity number | ml/g | 40.4 | 34.2 | 36.2 | 37.9 | 38.3 | 44.8 | 50.6 | 46.8 | 46.7 |
| | | Viscosity-average molecular weight (Mv) | g/mol | 14,500 | 11,811 | 12,700 | 13,400 | 13,600 | 16,500 | 19,000 | 17,400 | 17,300 |
| Solution transmittance | | % T at 380 nm | % | 97.8 | 98.0 | 98.4 | 98.1 | 98.1 | 98.0 | 97.8 | 98.0 | 97.9 |
| Injection plate YI (molded at 280° C., 3-mm thick) | | | — | 0.98 | 0.88 | 0.91 | 0.91 | 0.91 | 0.95 | 1.00 | 1.02 | 1.00 |
| Kneading condition | | Resin supply quantity Q | kg/h | 1,000 | 1,000 | 800 | 800 | 800 | 800 | 800 | 800 | 800 |
| | | Screw revolution number Ns | rpm | 530 | 530 | 423 | 424 | 421 | 423 | 423 | 423 | 423 |
| | | Q/Ns | kg/(h · rpm) | 1.9 | 1.9 | 1.9 | 1.9 | 1.9 | 1.9 | 1.9 | 1.9 | 1.9 |

| | | General name | | Comparative Example | | | | | | | |
| | | | | 1 | 2 | 3 | 4 | 5 | 6 | 7 | 8 |
|---|---|---|---|---|---|---|---|---|---|---|---|
| Formulation (resin) | PC-1 | Bisphenol A polycarbonate | Mv: 11,400 | 100 | | | | | | | |
| | PC-2 | | Mv: 12,300 | | 100 | | | | | | |
| | PC-3 | | Mv: 14,500 | | | 100 | | | | | |
| | PC-4 | | Mv: 17,300 | | | | 100 | | | | |
| | PC-5 | | Mv: 19,200 | | | | | 100 | | | |
| | PC-6 | | Mv: 21,500 | | | | | | 100 | | |
| | PC-7 | | Mv: 23,500 | | | | | | | 100 | |
| | PC-8 | PC-PTMG copolymer | Mv: 12,700 | | | | | | | | 100 |
| Formulation (additive) | A-1 | KR511 | Polyorganosiloxane compound | | | | | | | | |
| | B-1 | ADK STAB PEP36 | Bis(2,6-di-tert-butyl-4-methylpheny) pentaerythritol diphosphate | 0.10 | 0.10 | 0.10 | 0.10 | 0.10 | 0.10 | 0.10 | 0.10 |
| | | | | 0.05 | 0.05 | 0.05 | 0.05 | 0.05 | 0.05 | 0.05 | 0.05 |
| | B-2 | Doverphos S-9228PC | Bis(2,4-di-cumylphenyl) pentaerythritol diphosphite | | | | | | | | |
| | C-1 | RIKEMAL S100A | Stearic acid monoglyceride | | | | | 0.03 | 0.03 | 0.03 | 0.03 |
| | D-1 | POLYCERIN DC-3000E | Polyoxytetramethylene-polyoxyethylene glycol | | | | | | | | |
| | D-2 | POLYCERIN DC-1800E | | | | | | | | | |
| | E-1 | CELLOXIDE 2021P | 3,4-epoxycyclohexylmethyl-(3,4-epoxy)cyclohexane carboxylate | 0.02 | 0.02 | 0.02 | 0.02 | | | | |
| | F-1 | DIANAL BR83 | Acrylic resin | | | | | 0.10 | 0.10 | 0.10 | 0.10 |
| | G-1 | Irg168 | Tris(2,4-di-t-butylphenyl)phosphite | | | | | | | | |

TABLE 1-continued

| | | | | | | | | | Comparative Example | | | | | | |
|---|---|---|---|---|---|---|---|---|---|---|---|---|---|---|---|
| | | No. | General name | | 9 | 10 | 11 | 12 | 13 | 14 | 15 | | | | |
| Formulation (resin) | PC-1 | | Bisphenol A polycarbonate | Mv: 11,400 | | | | | | | | | | | |
| | PC-2 | | | Mv: 12,300 | | | | | | | | | | | |
| | PC-3 | | | Mv: 14,500 | | | | | | | | | | | |
| | PC-4 | | | Mv: 17,300 | | | 100 | | | | | | | | |
| | PC-5 | | | Mv: 19,200 | 100 | 100 | | 100 | | | | | | | |
| | PC-6 | | | Mv: 21,500 | | | | | | 100 | | | | | |
| | PC-7 | | | Mv: 23,500 | | | | | 100 | | | | | | |
| | PC-8 | | PC-PTMG copolymer | Mv: 12,700 | | | | | | | 100 | | | | |
| Formulation (additive) | A-1 | KR511 | Polyorganosiloxane compound | | | | | | | | | | | | |
| | B-1 | ADK STAB PEP36 | Bist(2,6-di-tert-butyl-4-methylphenyl) pentaerythritol diphosphite | | 0.10 | 0.10 | 0.10 | 0.10 | 0.10 | | | | | | |
| | B-2 | Doverphos S-9228PC | Bist(2,4-di-cumylphenyl) pentaerythritol diphosphite | | 0.03 | 0.03 | 0.03 | 0.03 | 0.03 | | | | | | |
| | C-1 | RIKEMAL S100A | Stearic acid monoglyceride | | | | | | | | | | | | |
| | D-1 | POLYCERIN DC-3000E | Polyoxytetramethylene-polyoxyethylene glycol | | | | | | | | | | | | |
| | D-2 | POLYCERIN DC-1800E | | | | | | | | | | | | | |
| | E-1 | CELLOXIDE 2021P | 3,4-epoxycyclohexylmethyl-(3,4-epoxy)cyclohexane carboxylate | | 0.03 | 0.03 | 0.03 | 0.03 | 0.03 | | | | | | |
| | F-1 | DIANAL BR83 | Acrylic resin | | 0.10 | 0.10 | 0.10 | 0.10 | 0.10 | | | | | | |
| | G-1 | Irg168 | Tris(2,4-di-t-butylphenyl)phosphite | | | | | | | | | | | | |
| Molecular weight | PC viscosity number | | | ml/g | 46.5 | 46.5 | 46.5 | 46.5 | 60.1 | 40.5 | 47.3 | | | | |
| | Viscosity-average molecular weight (Mv) | | | g/mol | 17,000 | 17,000 | 17,000 | 17,000 | 23,500 | 14,600 | 17,600 | | | | |
| Solution transmittance | % T at 380 nm | | | % | 96.4 | 97.2 | 97.1 | 96.5 | 96.6 | 96.7 | 96.4 | | | | |
| Injection YI | Injection plate YI (molded at 280° C., 3-mm thick) | | | — | 1.22 | 1.12 | 1.13 | 1.20 | 1.20 | 1.18 | 1.23 | | | | |
| Kneading condition | Resin supply quantity Q | | | kg/h | 1,000 | 1,000 | 1,000 | 1,000 | 800 | 800 | 1,000 | | | | |
| | Screw revolution number Ns | | | rpm | 714 | 621 | 455 | 417 | 423 | 423 | 526 | | | | |
| | Q/Ns | | | kg/(h · rpm) | 1.4 | 1.6 | 2.2 | 2.4 | 1.9 | 1.9 | 1.9 | | | | |

| | | | 9 | 10 | 11 | 12 | 13 | 14 | 15 |
|---|---|---|---|---|---|---|---|---|---|
| Molecular weight | PC viscosity number | ml/g | 33.4 | 33.4 | 33.4 | 33.4 | 40.4 | 40.4 | 40.4 |
| | Viscosity-average molecular weight (Mv) | g/mol | 11,500 | 11,500 | 11,500 | 11,500 | 14,500 | 14,500 | 14,500 |
| Solution transmittance | % T at 380 nm | % | 97.1 | 97.5 | 97.6 | 97.2 | 96.9 | 97.4 | 97.5 | 97.0 |
| Injection YI | Injection plate YI (molded at 280° C., 3-mm thick) | — | 1.13 | 1.08 | 1.06 | 1.11 | 1.15 | 1.09 | 1.08 | 1.14 |
| Kneading condition | Resin supply quantity Q | kg/h | 1,000 | 1,000 | 1,000 | 1,000 | 800 | 800 | 800 | 800 |
| | Screw revolution number Ns | rpm | 714 | 621 | 455 | 417 | 571 | 498 | 364 | 333 |
| | Q/Ns | kg/(h · rpm) | 1.4 | 1.6 | 2.2 | 2.4 | 1.4 | 1.6 | 2.2 | 2.4 |

TABLE 2

| | Example | | | Comparative Example |
|---|---|---|---|---|
| Evaluation as light-guiding plate | 3 | 12 | 13 | 14 |
| Difference in x chromaticity (light incidence portion-anti-light incidence portion) | 1.6 | 1.4 | 1.3 | 2.9 |
| Difference in y chromaticity (light incidence portion-anti-light incidence portion) | 1.8 | 1.3 | 1.2 | 3.1 |

It is found from the foregoing that when the biaxial kneader (TEX65αII) is used, the color tone of a pellet is improved best by controlling the Q/Ns to 1.85 to 1.95. As a value for the Q/Ns deviates from the values, the solution transmittance in the short wavelength region and the injection plate YI reduce.

It is found that in Examples, when Example 1 (Mv=11,500), Examples 3, 4, and 5 (Mv=14,500), Example 6 (Mv=17,300), Example 7 (Mv=19,200), and Example 8 (Mv=21,500) none of which is blended with the PC-8, D-1, and D-2 each having a color tone-improving effect are compared, the pellet has a higher solution transmittance at 380 nm and is more excellent in color tone as its Mv becomes smaller. This is probably because of the following reason: as the Mv becomes smaller, the temperature of an extruder can be set to a low value from the viewpoint of flowability, and hence thermal hysteresis to be applied to the resin at the time of the kneading can be reduced and a reduction in color tone is suppressed. Meanwhile, the pellet is more excellent in mechanical strength as the molecular weight becomes larger.

In addition, when a light-guiding member is molded, in Comparative Example 14, the x chromaticity difference is as high as 2.9% and the y chromaticity difference is as high as 3.1%. In contrast, in each of Examples 3, 12, and 13, the x chromaticity difference is suppressed to 1.3 to 1.6% and the y chromaticity difference is suppressed to 1.2 to 1.8%. Therefore, it is found that a light-guiding member excellent in color tone uniformity irrespective of its position from a light source can be provided by molding the light-guiding member out of the pellet of the present invention.

INDUSTRIAL APPLICABILITY

The polycarbonate resin composition pellet of the present invention is reduced in yellow tinge even when an additive such as a bluing agent is not incorporated, has a high light transmittance in a short wavelength region, and is useful as a raw material for an optical member such as the light-guiding plate of a liquid crystal backlight unit.

The invention claimed is:

1. A method for producing a light-transmissive pellet, the method comprising kneading and granulating a polycarbonate resin composition at a ratio Q/Ns that is effective to produce a pellet having a light transmittance at a wavelength of 380 nm of 97.8% or more and having a viscosity-average molecular weight (Mv) of from 11,000 to 22,000, wherein:
   in the ratio Q/Ns, Q represents a resin supply quantity (kg/h) of a kneading machine, and Ns represents a screw revolution number (rpm) of the kneading machine; and
   the pellet is adapted to function as a resin material for a light-transmissive member.

2. The method of claim 1, wherein the pellet comprises at least one component selected from the group consisting of components (A) to (F) with respect to 100 parts by mass of a resin component:
   (A) 0.01 to 0.3 parts by mass of an organopolysiloxane compound having at least one functional group selected from the group consisting a phenyl group, an alkoxy group, and a vinyl group;
   (B) 0.01 to 0.10 parts by mass of at least one antioxidant that is a phosphoric acid ester represented by formula (I-1):

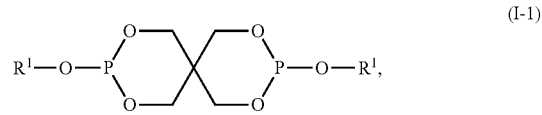

wherein each $R^1$ independently represents an aryl group or an alkyl group;
   (C) 0.01 to 0.10 parts by mass of at least one release agent that is a fatty acid monoglyceride having 16 to 30 carbon atoms;
   (D) 0.1 to 5 parts by mass of a polyoxytetramethylene-polyoxyethylene glycol represented by formula (II):

$$HO(CH_2CH_2CH_2CH_2O)_m(CH_2CH_2O)_nH \qquad (II),$$

wherein m and n each independently represent an integer of from 4 to 60, and m+n represents an integer of from 20 to 90;
   (E) 0.01 to 0.03 parts by mass of an alicyclic epoxy compound; and
   (F) 0.01 to 1 parts by mass of an acrylic resin having a molecular weight of from 200 to 100,000.

3. The method of claim 1, wherein:
   the polycarbonate resin composition, before the granulating into the pellet, has a solution transmittance at a wavelength of 380 nm of 98.0% or more; and
   a reduction amount of the solution transmittance in the kneading and granulating step is 1.0% or less.

4. The method of claim 1, wherein the kneading machine is a biaxial kneader.

5. The method of claim 1, wherein a temperature in the range of from a cylinder to a die of the kneading machine ranges from 220° C. to 270° C.

6. The method of claim 1, wherein the kneading machine has a single screw having a layout selected from the group consisting of a wide full flight, full flight, and neutral layout.

7. The method of claim 2, wherein the pellet comprises stearic acid monoglyceride as the release agent (C).

8. The method of claim 2, wherein the pellet comprises a polymethyl methacrylate as the acrylic resin (F).

9. The method of claim 2, wherein the pellet comprises an acrylic resin (F) having a molecular weight of 20,000 to 60,000.

10. The method of claim 1, wherein the pellet has the light transmittance at a wavelength of 380 nm of 98.0% or more.

11. An optical guiding member, which is obtained by molding a pellet produced by the method of claim 1.

* * * * *